United States Patent [19]

Liu

[11] Patent Number: 5,325,275
[45] Date of Patent: Jun. 28, 1994

[54] ANGLE ADJUSTABLE CAR READING LAMP

[76] Inventor: Hui-Long Liu, No. 2-4, Shih Tzyy Kuoo, Shan Shahng Shiang, Tainan Shien, Taiwan

[21] Appl. No.: 50,662

[22] Filed: Apr. 22, 1993

[51] Int. Cl.⁵ .................................................. B60Q 3/02
[52] U.S. Cl. .................................... 362/80; 362/66; 362/322; 362/326
[58] Field of Search ............... 362/61, 66, 74, 80, 362/83.3, 319, 322, 323, 326, 433

[56] References Cited

U.S. PATENT DOCUMENTS

| | | | |
|---|---|---|---|
| 2,957,073 | 10/1960 | Legge | 362/80 |
| 3,053,337 | 9/1962 | Prohaska et al. | 362/80 |
| 3,515,863 | 6/1970 | Jungwirth | 362/74 |
| 4,654,757 | 3/1987 | Birkhauser | 362/80 |
| 4,760,500 | 7/1988 | Peng | 362/74 |

FOREIGN PATENT DOCUMENTS

| | | | |
|---|---|---|---|
| 3323236 | 1/1985 | Fed. Rep. of Germany | 362/74 |
| 739938 | 11/1955 | United Kingdom | 362/74 |

Primary Examiner—Ira S. Lazarus
Assistant Examiner—Alan B. Cariaso

[57] ABSTRACT

An angle adjustable car reading lamp having a housing to deposit a case-like frame covered with are movable light penetrating plate and an upper cap to close an open top of the housing, the housing having a semi-roundly curved conductive plate fixed on an inner side wall bored with small grooves for an elastic conductive plate fixed on the frame to fit in one of the grooves to secure the frame at one of a plurality of adjustable andles when the frame is rotated to the right or the left.

1 Claim, 4 Drawing Sheets

ANGLE ADJUSTABLE CAR READING LAMP

BACKGROUND OF THE INVENTION

A conventional car reading lamp shown in FIG. 1 comprises a base 1, an upper cap 2 and a lamp plate. The upper cap 2 has a central opening 20, a projection 21 (22) respectively on two opposite side walls defining the central opening 2 to fit in a hole 30 (31) to enable the light plate 3 to swing up or down pivotally with the projections 21, 22 as pivots. So the angle of the lamp plate 3 can be changed. Then the base 1 and the upper cap 2 are combined tightly with screws. However, this conventional car reading light has no means to secure the lamp plate 3 at an angle when the lamp plate 3 rotates to the right or to the left, so the angle of the reading lamp is liable to change because of a bumping or a sudden stop when a car is running.

SUMMARY OF THE INVENTION

This invention has been devised to improve the conventional car reading lamp, having a structure of securing the angle of a reading lamp when its angle adjusted for convenience of reading.

A main feature of the present invention is a semi-roundly curved conductive plate having a plurality of samll grooves spaced apart for a tip of an elastic conductive plate to engage one of the small grooves to that a case-shaped frame covered with a transparent light penetrating plate and having the elastic conductive plate may be rotated to one of a plurality of angles adjustable to the right or to the left in relative to a housing, in whcich the frame is deposited. So the angle of the light penetrating plate with the frame can be secured at the angle adjusted by means of the elastic conductive plate and the semi-roundly curved conductive plate on an inner side wall bored with small grooves for the lower tip of the elastic conductive plate to engage one of the grooves to secure the frame at an adjusted angle when the frame is rotated.

DETAILED DESCRIPTION OF THE INVENTION

Figure 1:
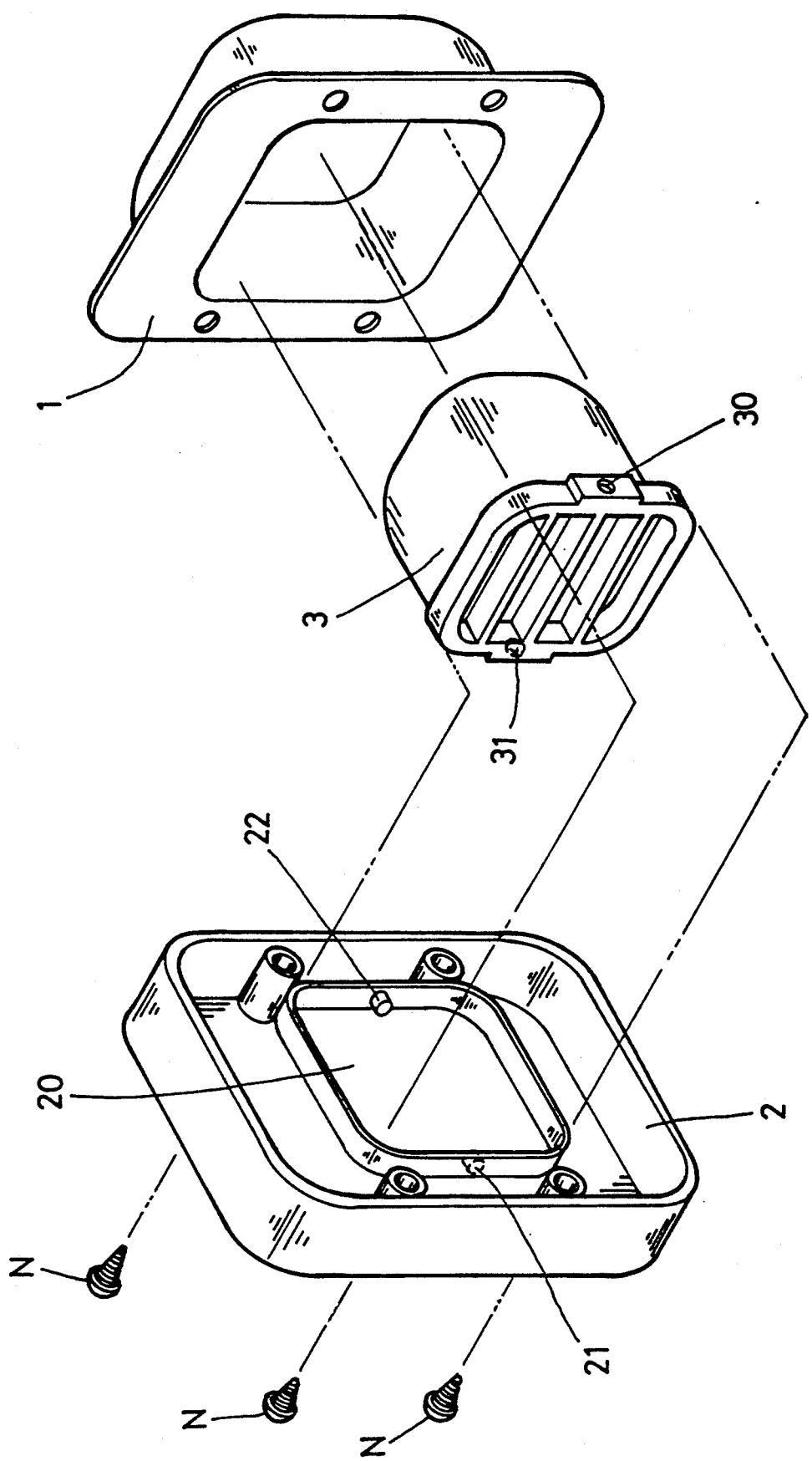
FIG. 1 is an exploded perspective view of a conventional car reading lamp.
Figure 2:
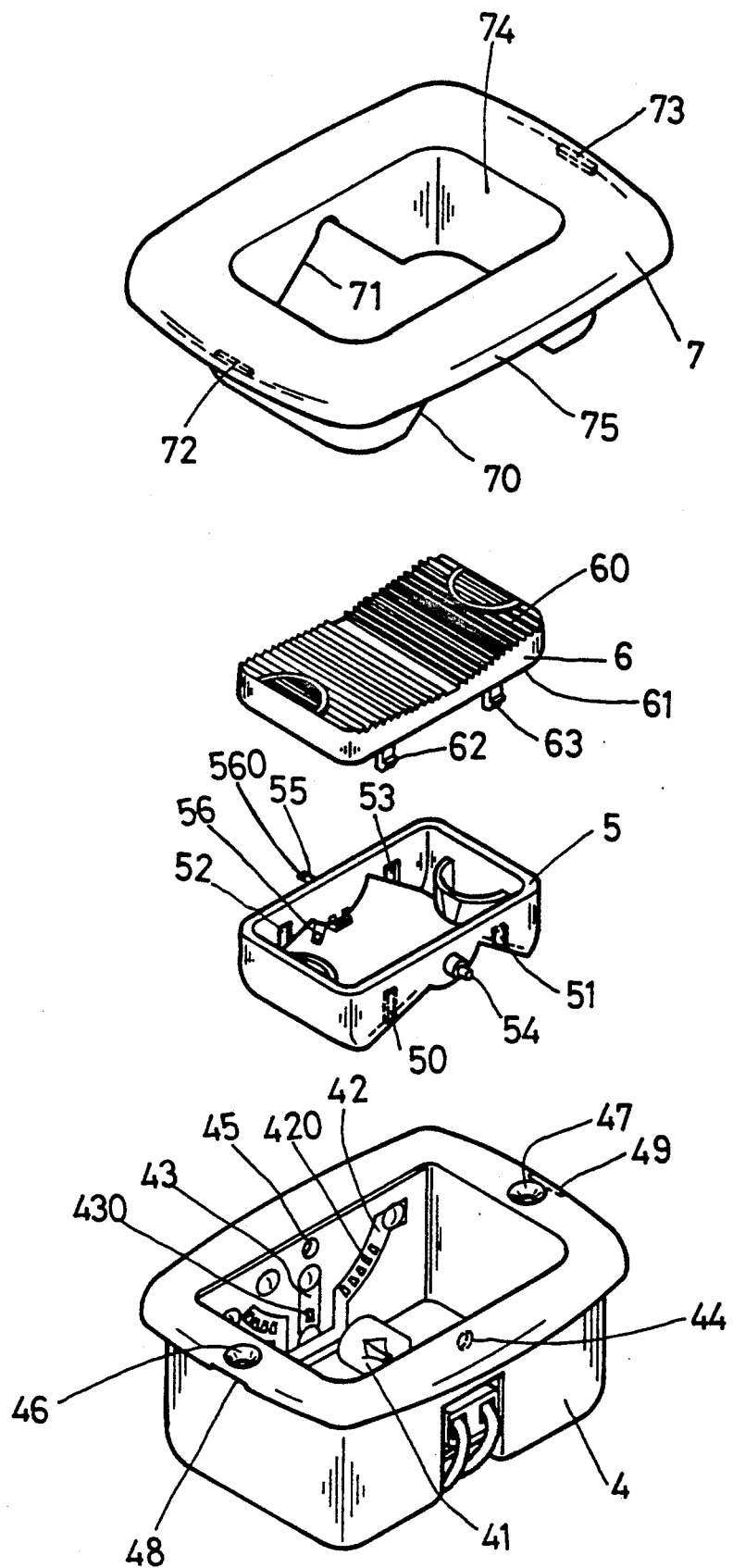
FIG. 2 is an exploded perspective view of an angle adjustable car reading lamp in the present invention.
Figure 3:
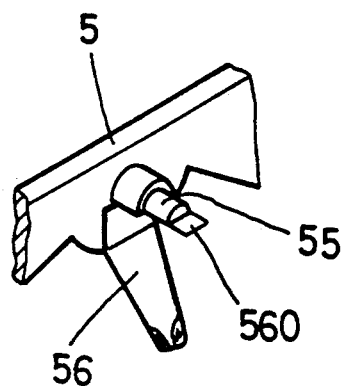
FIG. 3 is a perspective view of an elastic conductive plate in the angle adjustable car reading lamp in the present invention.

An angle adjustable car reading lamp in the present invention, as shown in FIGS. 2 and 3, comprises a rectangular housing 4, a frame 5, a light penetrating plate 6 and an upper cap 7 as main components.

The housing 4 is like a rectangular case with an open top, having a lamp 41 mounted on a front inner wall, a semi-roundly curved conductive plate 42 and a vertical plate plate up in the middle of the curved conductive plate 42 fixed on a rear inner wall. The semi-roundly curved conductive plate 42 has a plurality of small locating grooves 420 in both sides, and the vertical plate 43 has a small locating groove 430. The housing 4 also has a round hole respectively in an upper intermediate portion of the front and the rear side wall, a cone-shaped hole 46 (47) respectively in an upper surface of a right and a left side of a circumferentail flange and a notch 48 (49) respectively in the upper surface edge of the right and the left side of the circumferential flange.

The frame 5 is shaped like a small case with an open top, being deposited inside the housing 4 and having two recesses 50, 52 (52, 53) respectively in opposite position in a front and a rear wall, a projection 54 (55) on the outer surfaces of the front and the rear side wall corresponding to the two round holes 44 (45) in the housing 4, an elastic conductive plate 56 with a bent portion 560 extending along the flat surface of the semi-round projection 55 to protrude a little out of the tip of the projection 55 on the outer surface of the rear side wall.

The light penetrating plate 6 made of a transparent material is hooked to close the open top of the frame 5, having a sawtoothed upper surface 60 gradually sloping down from the right and the left side to the middle portion and a saw-toothed lower surface 61 gradually sloping down from the front and the rear side to the middle portion, two hooks extending down from the front and the rear side edge to hook in the recesses 50, 51, 52, 53 in the frame 5.

The upper cap 7 is covered on the open top of the housing 4, having a circumferential wall 74 extending down vertically to fit around the inner wall of the housing 4, and two straight ridges 72, 73 under the right and the left upper side to fit with the two notches 48, 49 in the housing 4 to secure the upper cap 7 with the housing. The upper side of the cap 7 extends horizontally past the circumferential wall 74 to form a flange 75. The front and the rear side of the circumferential wall have an inverted V-shaped notches 70, 71.

Figure 4:
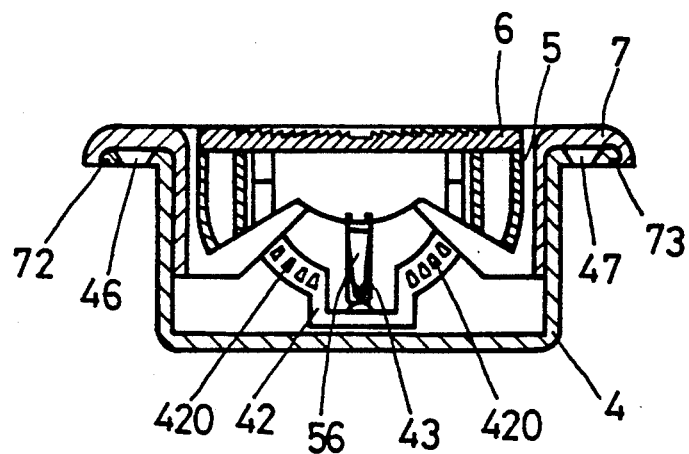
FIG. 4 is a cross-sectional view of the angle adjustable car reading lamp in the present invention.

In assembling, as shown in FIG. 4, at first the light penetrating plate 6 is pressed down on the frame 5, with the hooks 62, 63, 64, 65 hooking the recesses 50, 51, 52, 53 of the frame 5 and then the frame 5 with the light penetrating plate 6 is inserted in the interior of the housing 4. The upper cap 7 is pressed in and covers the open top of the housing 4 with the projecting ridges 72, 73 fitting in the notches 48, 49.

Figure 5:
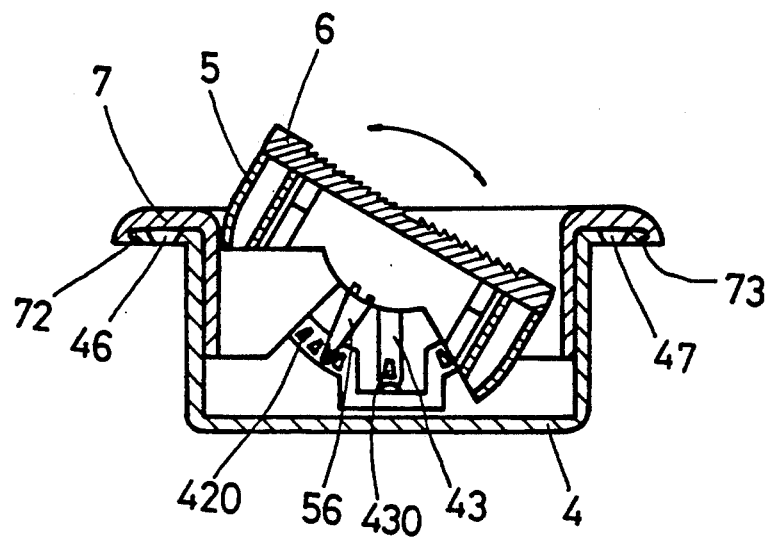
FIG. 5 is a cross-sectional view of the angle adjustable car reading lamp in the present invention, showing the angle of the frame with the light penetrating plate adjusted.

In using, referring to FIGS. 2 and 5, the frame 5 can rotate in relation to the housing 4 freely to the right and the left by means of the semi-round projection 55 and the round projection 54 inserting pivotally in the round holes 44, 45 of the housing. When the frame 5 is pivotally connected with the housing 4, the end of the elastic conductive plate 56 is elastically pressed to engage the location groove 430 of the vertical plate 43 as shown in FIG. 4 or in one of the location grooves 420 of the semi-roundly curved conductive plate 42 so that the frame may be secured at one of the plurality of angles adjustable. When the elastic conductive plate 56 engages with the vertical plate 43, the frame is located in a neutral position, with electricity not through. Then the angle of the frame 5 with the light penetrating plate 6 can be changed according to necessity by a user by rotating the frame 5, with the elastic conductive plate 56 to engage one of the location grooves 420 of the semi-roundly curved conductive plate 42, with electricity through to light up the lamp.

As the semi-roundly curved conductive plate 42 is connected with one conductive wire connected with one pole of the lamp 41, and the other wire connected with the other pole of the lamp 41 is in contact with the lower end of the elastic conductive plate 56, so the lamp 41 can be lit up by the elastic conductive plate 56 engaging one of the location grooves 420 of the semi-roundly curved conductive plate 42 when the frame 5 is rotated to one of the plurality of angles adjustable. Consequently, a changeover switch is not necessary.

What is claimed is:

1. An angle adjustable car reading lamp comprising:
   a housing shaped as a rectangular case with an open top and with a flange around the open top, the housing having a lamp mounted on a front inner wall, a curved conductive plate and a vertical straight plate fixed on a rear inner wall thereof, the housing further including round holes bored in front and rear walls, a cone-shaped hole and a notch bored in a left and a right upper side respectively;
   a frame to be received in the interior of said housing, the frame being shaped as a rectangular case with an open bottom and an open top, the frame having two vertical grooves in both a front and a rear wall, a projection protruding from both the front and the rear walls, the projection fitting into the round holes in the front and rear walls of the housing so as to make the frame rotatable relative to the housing, the frame further including an elastic conductive plate with a bent portion fixed below said projection on the rear wall, the bent portion extending along the projection and having a length slightly longer than that of the projection;
   a plate made of a transparent material with a rectangular shape to be closed on the open top of said frame, the plate having two hooks extending down from a front and a rear side respectively to hook said two grooves in the front and rear side wall of said frame to secure the plate on said frame;
   an upper cap of a rectangular shape to close on said housing, having a circumferential vertical wall, an open top and bottom, a flange around the open top, an inverted V-shaped notch in a front and a rear wall respectively, and a projecting-down ridge on a lower surface of a left and a right side of the flange to engage the notches in the left an the right upper side respectively of the flange of the housing so as to secure the upper cap on said housing; and
   said frame being rotatable within the housing, the angle of light being changed by the frame being rotated until the electric conductive plate engages in the one of a plurality of location grooves in the curved conductive plate of the housing.

* * * * *